(12) United States Patent
MacQueen et al.

(10) Patent No.: US 6,871,200 B2
(45) Date of Patent: Mar. 22, 2005

(54) REGISTRATION AND MONITORING SYSTEM

(75) Inventors: Duncan David MacQueen, Corbridge (GB); Martin Fawcett-Lipscombe, East Lothian (GB)

(73) Assignee: Forensic Eye Ltd., Edinburgh (GB)

( * ) Notice: Subject to any disclaimer, the term of this patent is extended or adjusted under 35 U.S.C. 154(b) by 434 days.

(21) Appl. No.: 10/194,907

(22) Filed: Jul. 11, 2002

(65) Prior Publication Data

US 2004/0010486 A1 Jan. 15, 2004

(51) Int. Cl.$^7$ ............................................. G06F 17/30
(52) U.S. Cl. ................... 707/6; 707/5; 707/10
(58) Field of Search ............................ 707/1, 2, 3, 4, 707/5, 10, 101, 6, 8, 9; 382/119; 715/500; 705/2; 717/103

(56) References Cited

U.S. PATENT DOCUMENTS

| | | | | |
|---|---|---|---|---|
| 5,920,867 A | * | 7/1999 | Van Huben et al. | 707/101 |
| 6,035,297 A | * | 3/2000 | Van Huben et al. | 707/8 |
| 6,687,390 B2 | * | 2/2004 | Avni et al. | 382/119 |

OTHER PUBLICATIONS

Bessarabov, I et al., "Visual preception and selective image analysis", Second International Symposium on Neuroinformatics and Neurocomputers, IEEE 1995, pp. 46 –53.*

* cited by examiner

*Primary Examiner*—Shahid Alam
(74) *Attorney, Agent, or Firm*—Frank J. Dykas; Robert L. Shaver; Derek H. Maughan (57) ABSTRACT

A method and system are provided whereby rights in graphic works such as digital photographs and the like may be registered, and potential infringements of those rights monitored. The method includes storing representations of the works in a computer database together with details of any licensed users of the work, obtaining comparison representations from the internet or other computer network, and comparing the two representations to determine whether a threshold of similarity has been met. If the representations are determined to be similar or identical, the identity of the user of the comparison representation is determined and compared with identity of licensed users. In the event that the user is unlicensed, appropriate action such as alerting the rights owner may be taken.

The database may also be used for displaying a portfolio of a rights owner's works, or for granting licences to use registered works.

33 Claims, 3 Drawing Sheets

REGISTRATION AND MONITORING SYSTEM

FIELD OF THE INVENTION

The present invention relates to a method and to an apparatus for registration of works, in particular graphic works, and for monitoring use of such works. Further aspects of the invention relate to methods and systems for licensing use of registered works.

BACKGROUND OF THE INVENTION

Many creative industries and individuals within those industries generate graphic works in the course of their work. For example, photographers, artists, architects, designers, graphic artists, web page designers, and the like all generate graphic works. By the term 'graphic work' is included any and all works which have a visual component, including photographs, drawings, paintings, sculptures, logos, plans, images, animations, films, and the like. In order to protect the creator's or owner's investment in these works, the-concept of copyright has evolved. However, copyright only allows an owner to enforce their rights in the work once an unauthorised use of the work has been identified. Copyright is generally the property of the creator of the work, unless and until the copyright is assigned. Rights in the copyright of the work may be assigned separately from the work itself. Although systems exist for marking images to denote ownership of rights, there are currently no systems in place for systematically identifying potentially infringing copies of copyright works, which is thus generally left to chance. The existence of copyright licensing or collection agencies may go some way toward addressing these issues, but the operations of such agencies cannot be regarded as systematic. This means that an owner may be unaware of unauthorised use of their copyright works, and hence unable to take action. Both copyright owners' income and professional reputation may suffer as a result. In addition, although third parties may be licensed to use a particular work for a certain period, it may be difficult to ensure that their use is in accordance with the terms of the licence, and ceases when the licence expires.

The problem of unauthorised use of copyright works has mushroomed dramatically in recent years with increased use of the internet and other computer networks. Once an image is posted on a web site, there is little to prevent third parties from copying the image for their own use, despite the fact that this is generally prohibited by copyright. Preventing or even identifying such unauthorised uses can be practically impossible. Digital photography, too, means that a photograph, once created, may be copied many times without any loss of quality and without requiring access to the original work. The problem of preventing a twentieth-generation copy of a work being posted on an obscure corner of the internet is practically insurmountable with present methods. Digital 'watermarks' or pixel embedding may be used, that is patterns embedded into the digital file, but these will adversely affect image quality and so will not be suitable for many applications where high-quality images are required. The use of such techniques may also interfere with the visual appreciation of the image, which is undesirable when the image is an artistic work. Further, the use of watermarks can only affect a particular copy of an image, and not the rights in the image itself. It may also be possible for skilled persons to remove digital watermarks or embedded pixels incorporated in some images, so circumventing the protection afforded thereby.

Furthermore, in many jurisdictions there is also no method of registering ownership of a copyright work. Thus, when an owner does discover an infringement, it is then still necessary to demonstrate ownership and the date of creation of the work. While many people are aware of this, and keep careful records accordingly, in a large number of cases it is not possible to demonstrate ownership or creation, particularly if some time has passed since the creation of the work, or where the ownership of the work has been transferred a number of times and the original creator can no longer be found. In some cases, ownership may be demonstrated simply through first publication, which may not accord with the legal owner of copyright. Some professional bodies do recommend registration of copyright works where possible, but again it may be difficult to monitor and police subsequent use of the work. This can also assume importance where the images are digital, since increasingly there will be no physical 'original' work to register.

This feature of monitoring ownership of a work and of transfers of title or licensing also assumes importance in those jurisdictions which offer a 'resale right' to the creator—that is, a right to the creator of a work to benefit financially when the work is subsequently sold or licensed to others. For example, the European Union have recently adopted a Directive to provide for such a right in the case of works of art, which a number of European states already do as a matter of course. In order for such a right to be effective, it is necessary to be able to monitor transfers of works together with maintaining records as to the creator of the work.

In addition to the problem of monitoring uses of their work, many creators and in particular independent creators such as freelance photographers and the like face some difficulty in making their works accessible to potential customers or users. Although wishing to avoid unlicensed use, most creators would be happy for third parties to be able to access their portfolio and to purchase licences to use works freely. Independent creators can face problems in making their works accessible to large potential audiences, and in dealing with the legal aspects which arise from licensing deals.

The foregoing problems also apply to rights other than copyright per se—for example, related rights such as publication rights, performance rights, and the like. In fact, the owner of essentially any rights may wish to register ownership and monitor unauthorised uses.

It is among the objects of embodiments of the present invention to obviate or to alleviate these and other difficulties in the prior art. This is achieved in certain embodiments of the invention by the provision of a method whereby a rights owner can register a work, and monitor occurrences of that work on the internet and elsewhere. Further aspects of the invention provide for portfolio management and licensing of users; this may be in combination with or separate from the monitoring aspect of the invention.

SUMMARY OF THE INVENTION

According to a first aspect of the invention, there is provided a method of monitoring uses of graphic works, the method comprising the steps of:

storing a digital representation of a work in a computer database;

associating data entries with the stored representation, the data entries indicating at least the owner of rights in the work and details of any licensed users of the work;

obtaining a comparison digital representation and information regarding the user of the comparison representation from a remote host computer;

comparing the stored representation with the comparison representation, to determine the level of similarity between the representations;

determining whether the level of similarity exceeds a predetermined threshold;

if the level of similarity does exceed the threshold, determining whether the user of the comparison representation is a licensed user of the stored representation; and alerting the owner of rights in the stored representation if the user of the comparison representation is not licensed.

Thus, the present invention allows a rights owner to record their work in a database, which also provides for details of the rights owner and any licensed users to be recorded. Comparison images are then obtained, for example from the internet or other data network, and compared with the recorded or registered work. Where the two images are sufficiently similar, and hence likely to be the same work, the owner of the rights is alerted if the user of the comparison image is not licensed by the rights owner.

In this context, the term 'graphic work' applies to any work having a visual content. The term is intended to include, but is not limited to, photographs, drawings, paintings, sequences or images from audio-visual works such as films or television broadcasts, logos, trade marks, plans, blueprints, and the like. The term also includes images of objects which themselves have a visual component; for example, sculpture, buildings, images of people such as celebrities, fashion, interior design, and the like.

The owner of rights in the work may refer to a copyright or other intellectual property right holder, or may refer to a representative of the legal rights owner; for example, an agent, attorney, gallery owner, or the like, who will thus be notified and able to act on their client's behalf. The rights owned by the rights owner may also be simply rights under a licence in the work, rather than the outright owner of the copyright. It will be clear that the rights owner need not be the owner of any physical work, since ownership of copyright may be transferred separately from ownership of a particular work. It will of course also be clear that the rights owner referred to may be the owner of the physical work, and further that they may not legally own any copyright or other rights in the work. The rights owned by the rights owner may further be other than intellectual property rights; for example, rights to own or display the work, the right of possession, or the like.

The digital representation of the work may be a digital photograph of the work, for example, where the work itself is a sculpture or the like; or may be a digital image, such as a scanned and digitised drawing; or may be the image itself, for example where the work is created by means of a computing device, or where the work is a digital photograph.

Preferably the stored representation is stored as a non-encrypted computer file. This not only aids in the subsequent comparison steps, since it is not necessary to decrypt the image before comparison, so speeding up the process, but also permits third parties to access the representation without a decryption key, if desired. This can be advantageous to rights owners who wish to make their works available to others, as will be discussed further below. Although the representation is preferably non-encrypted, the use of compression technology, for example JPEG or JPEG2000 standards, may be desirable to reduce the memory storage required. Where available memory is not an issue, however, compression is not necessary and may be avoided to reduce the risk of loss of information from the files. There may also be a certain minimum size of image which may be used for comparison, depending on the method of comparison being used. The stored representation may also include a watermark or other visual symbol, which may be used to alert users to the registration of the work, or for branding purposes by the operator of the method, or the like.

The step of storing the digital representation of the work may be carried out by directly transferring the representation from a rights owner's storage medium to the database. For example, where the work is in the form of a digital photograph, the representation may simply be uploaded to the database. Conveniently this may take place remotely, for example through a data communications network such as the internet. Certain embodiments of the invention may provide for representations to be uploaded automatically on creation; for example, a photographer may create many works in a single session, and may use a digital camera configured to automatically connect to a communications network and upload every photograph as it is taken. This ensures that every image taken will be stored and may be monitored for unauthorised usage automatically. Alternatively, representations may be created and stored in the database by third parties from works created by the rights owners; for example, individual artists may wish to take their works such as paintings to a specialist agent who will then generate a digital representation and store that representation in the database. The third party may be the operator of the database. A still further possibility is that the rights owner may generate digital representations themselves onto a storage medium, and transfer this medium to third parties who will then upload the representations to the database. Still further, an integrated software tool or the like may be provided, which combines local management and administration of a user's images with submission and registration to the database. The tool may also include means for assisting with licensing of the images.

The data entries associated with the stored representation may conveniently be combined with the representation into a single computer data file; or as a series of linked files. Alternatively, the data entries may be stored separately, with a flag or other marker to indicate their association with the stored representation. The data entries may be in the form of plain text data strings, or may be flags or other field codes to represent particular types of data.

In addition to the owner of the rights and details of any licensed users of the work, the data entries may include any or all of the following information: details of the extent and scope of any licences granted; availability of possible licences; details of the licensing history of the work, that is, previous and expired licences and licensees; details of the ownership history of the work; details of the ownership history of any rights in the work; details of the author of the work; whether or not the representation is publicly available for viewing in the database; date of creation of the work; date of submission of the representation to the database; information regarding the work itself, such as subject, keywords, materials used, and the like. It will of course be understood that this list is neither exhaustive nor limiting, and that any other data entries may also or instead be made.

The method may further comprise the step of comparing the stored representation with previously stored representations, to determine the level of similarity between the representations. This provides a check on the submission of duplicate representations. Where the similar representations are indicated as having different owners of rights, the method may comprise the step of informing each owner of rights to resolve ownership, or to arbitrate between disputants. Where the same owner has duplicate stored representations, a duplicate representation may be deleted, preferably having first confirmed with the owner or their agent that the duplicate may be deleted.

The step of obtaining a comparison representation from a remote host computer may comprise downloading the representation from a computer network such as the internet. This may conveniently be automated by, for example, using a 'spider' or 'web crawler'; that is, a computer program which systematically downloads web pages and images from the internet or another network. For example, the program may be configured so as to obtain only image files from the network. Where images are retrieved from a network, the information regarding the user may for example be retrieved from metatags incorporated in the HTML or other code comprising the web page, or may simply be derived from the URL or other resource locator making up the address of the web page. Alternatively, user information may of course be found on the web page itself. The method may further comprise the step of temporarily saving comparison representations in a local memory cache once they have been obtained, so that the representation may he accessed more rapidly in subsequent comparison steps. Information regarding the location of the image on the network may also he recorded.

In certain embodiments of the invention, the method may further comprise the step of manually submitting and storing comparison representations in a host computer for subsequent comparison. Although many potential infringements may be posted on the internet, and so available for comparison, it may be that some infringements will only be published in conventional media or the like. Such potential infringements may be made more likely to be found if they are recorded on a computer network and so made readily available for comparison. The representations may be digitised and scanned in to a computer storage device, or they may be simply photographed digitally and uploaded to a host computer.

The comparison step may comprise the use of any suitable image comparison algorithm which returns a measure of similarity of two images. Suitable algorithms will be known to those of skill in the art. Images may be compared in a multi-step process, for example, firstly by use of a relatively less accurate matching tool to identify likely matches, followed by a more accurate comparison tool. This allows rapid discounting of non-matching images, with a more accurate (and hence likely to be more computationally expensive) matching only performed on likely matches. In certain embodiments, lower resolution versions of the images may be compared in the first stage, followed by higher resolution comparison only for the second stage; again, this is intended to reduce computer processing time. Further, the matching of image keywords or metatags associated with images may be used prior to assessment of similarity, to eliminate images which do not share common keywords and so are very unlikely to be similar; in preferred embodiments of the invention, where sufficient computing power is available, such images are nonetheless compared for similarity. This is intended to reduce the possibility that wrongly-classified images will not be identified.

The predetermined threshold of similarity may be determined on a work-by-work basis; for example, certain works may be subjectively considered to be more 'distinctive' than others (for example, artworks versus trade logos), and would be assigned a lower threshold of similarity than less 'distinctive' works. Alternatively, a predetermined level of similarity may be assigned to all works above which the owner is alerted. In certain embodiments of the invention, 'borderline' cases within a certain range of similarity may be referred to a human operator to assess whether the two representations are indeed similar. In certain embodiments of the invention, it may be the case that all potential matched images are referred to a human operator for a final decision. Images may also or instead be referred to the rights owner or their agent to take a final decision, or to an insurer or legal advisor in the event that insurance claims are to be made or legal action is to be taken.

The step of determining whether the user is a licensed user may comprise comparison of the data entries regarding licensed users of the work with the information regarding the user of the comparison representation. Additional information may be included in the comparison, such as duration and extent of any licences, to determine whether a user has breached the terms of their licence.

In certain embodiments of the invention, as well as or instead of alerting the owner of rights when an unlicensed use has been found, a nominated representative may be alerted (for example, an attorney, an agent, or a licensing agency).

The method preferably further comprises repeating the obtaining, comparison, and determination steps a plurality of times, to allow multiple comparison representations to he obtained and compared. The multiple representations may be obtained successively, or simultaneously, followed by the comparison steps.

The method may further comprise the step of charging an owner of rights in return for storing the representation in the database. Owners may be charged per stored representation, or a flat fee, or per potential unlicensed representation found. Alternatively, or in addition, where stored works are submitted through a third party such as an agent or gallery or the like, the method may include the step of charging the third party a flat fee or a subscription in return for allowing storage of representations. The third party may then choose to charge rights owners on one of the above bases, or may choose to absorb the costs into their general management fee or the like.

According to a second aspect of the invention, there is provided a method of monitoring uses of graphic works, the method comprising the steps of:

retrieving a stored digital representation of a work from a computer database, together with information regarding at least the owner of rights in the work and details of any licensed users of the work;

obtaining a comparison digital representation and information regarding the user of the comparison representation from a computer database;

comparing the stored representation with the comparison representation, to determine the level of similarity between the representations;

determining whether the level of similarity exceeds a predetermined threshold;

if the level of similarity does exceed the threshold, determining whether the user of the comparison representation is a licensed user of the stored representation; and alerting the owner of rights in the stored representation if the user of the comparison representation is not licensed.

According to a further aspect of the invention, there is provided a method of monitoring uses of graphic works, the method comprising the steps of:

storing a digital representation of a work in a computer database;

associating data entries with the stored representation, the data entries indicating at least the owner of rights in the work;

obtaining a comparison digital representation from a remote host computer;

comparing the stored representation with the comparison representation, to determine the level of similarity between the representations;

determining whether the level of similarity exceeds a predetermined threshold;

if the level of similarity does exceed the threshold, alerting the owner of rights in the stored representation of the comparison representation.

According to a further aspect of the present invention, there is provided a method of licensing uses of graphic works, the method comprising the steps of:

storing a digital representation of the work in a computer database;

associating data entries with the stored representation, the data entries indicating at least the owner of rights in the work and details of any licensed users of the work;

allowing third parties to view the stored representation;

making an agreement with a third party to permit certain uses of the representation in return for payment; and updating the data entries associated with the representation to include an indication of the identity of the third party.

Thus, this aspect of the invention makes use of a similar database arrangement to that described in connection with the above first aspect of the invention to allow third parties to access the representations and to conclude agreements to make use of the representations. The database may then be updated to include information on the third party, which allows the two aspects of the invention (monitoring and licensing) to be integrated into a single system.

The stored representation of the work may comprise two stored representations: a lower resolution or reduced quality representation, and a higher-quality representation. The reduced quality representation may be made freely viewable by third parties (for example, to allow browsing of the database), or to registered users only, while access to the higher quality representation may be restricted to licensed users. The lower resolution representation will also generally require less memory space for storage and computer processing than the higher quality representation, and so may be used in initial iterations of comparison procedures and the like, to identify likely matching representations.

The method may further comprise the step of allowing third parties to search the database for particular categories of work. For example, the database may be searched for all works owned by a particular rights owner; where the data entries include additional information, such as on the subject of the work or the like, the database may be searched in accordance with these data entries.

The agreement made with the third party may be mediated by means of a computer interface; preferably a computer interface which is also used to view the stored representation. The agreement may be concluded 'on-line'; that is, the third party concludes the agreement from the computer interface while accessing the database. Payment may also be made online, using conventional electronic payment means. The step of making the agreement may comprise the steps of: transmitting an offer to permit uses of the representation to the third party; receiving an acceptance of the offer from the third party; and receiving payment details from the third party. In certain embodiments of the invention, the offer may be modified or otherwise amended by the third party prior to acceptance; again, this may be conducted by means of the computer interface.

The third party may in addition be permitted to access details of the owner or of licensed users of the work. The existence of other licensed users may be significant to certain potential licensees; for example, if a commercial competitor has licensed a particular work for use in advertising, a third party is unlikely to wish to licence the same work for use in a similar market sector. Again, however, for commercial reasons the existing licensees may wish to remain secret to other potential licensees; to overcome this, trusted third parties may be permitted to mediate between potential new licensees and the database, to prevent such details becoming public.

The method may further comprise the step of permitting the third party to access the stored representation in accordance with the terms of the agreement. For example, the third party may be permitted to make a copy of the representation, or may simply be permitted to include a hyperlink or the like to the stored representation from their web page. The access may of course be time-limited or otherwise restricted in accordance with the agreement.

The data entries associated with the representation may further include information regarding the nature and extent of the agreement with the third party.

According to a still further aspect of the present invention, there is provided a method of registering a graphic work, the method comprising the steps of:

storing a digital representation of the work in a computer database; and associating data entries with the stored representation, the data entries indicating at least the owner of rights in the work and details of any licensed users of the work.

The method may further comprise the step of charging a rights owner in return for storing the digital representation of the work. The rights owner may be charged for initial storage of the representation, and/or for subsequent maintenance and additional storage periods of the representation.

The method may further comprise the step of permitting third parties to view representations stored in the database. This may be in return for payment from the third parties, either on a subscription basis or on a per-access basis.

Data entries may also be associated with the stored representations to indicate whether or not third parties are permitted to view the representation. In this way the method may be used as simply an image repository, for example for the purpose of demonstrating ownership, or may he used for marketing the work to third parties, or simply as a portfolio presentation system for artists and creators.

According to a further aspect of the present invention, there is provided a computer database structure, the database comprising data entries being digital representations of graphic works, and data entries associated with each digital representation indicating at least the owner of rights in the work, and details of any licensed users of the work.

According to a yet further aspect of the present invention, there is provided a system for monitoring uses of graphic works, the system comprising:

a computer database for storing digital representations of graphic works, together with database entries associated with each representation, the database entries indicating at least the owner of rights in the work and details of any licensed users of the work;

data communications means for communicating with and retrieving data including comparison representations and users of such representations from a remote host computer; and data processing means for retrieving representations from the computer database and for receiving communications from the data communications means; for comparing representations to determine their level of similarity; for determining whether a user of a comparison representation is a licensed user of a stored representation; and for alerting an owner of rights if a user of a comparison representation is not licensed.

Preferably the system further comprises data input means for adding data entries and representations to the computer database.

The data communications means may be a data connection to the internet or other computer network.

The system may further comprise means for allowing third parties to view stored representations. The third parties may view the representations locally, from the data processing means, or remotely, from a remote computer terminal communicating with the data processing means and database via the data communication means.

The system may yet further comprise data processing means connected to the data communications means for concluding agreements with third parties regarding use of stored representations. The data processing means may also comprise means for permitting secure electronic payment in return for use of stored representations. The data processing means is preferably in communication with the database, to allow updating of database entries when a third party concludes an agreement.

BRIEF DESCRIPTION OF THE DRAWINGS

These and other aspects of the present invention will now be described by way of example only and with reference to the accompanying drawings, in which.

DETAILED DESCRIPTION OF THE DRAWINGS

Figure 1:
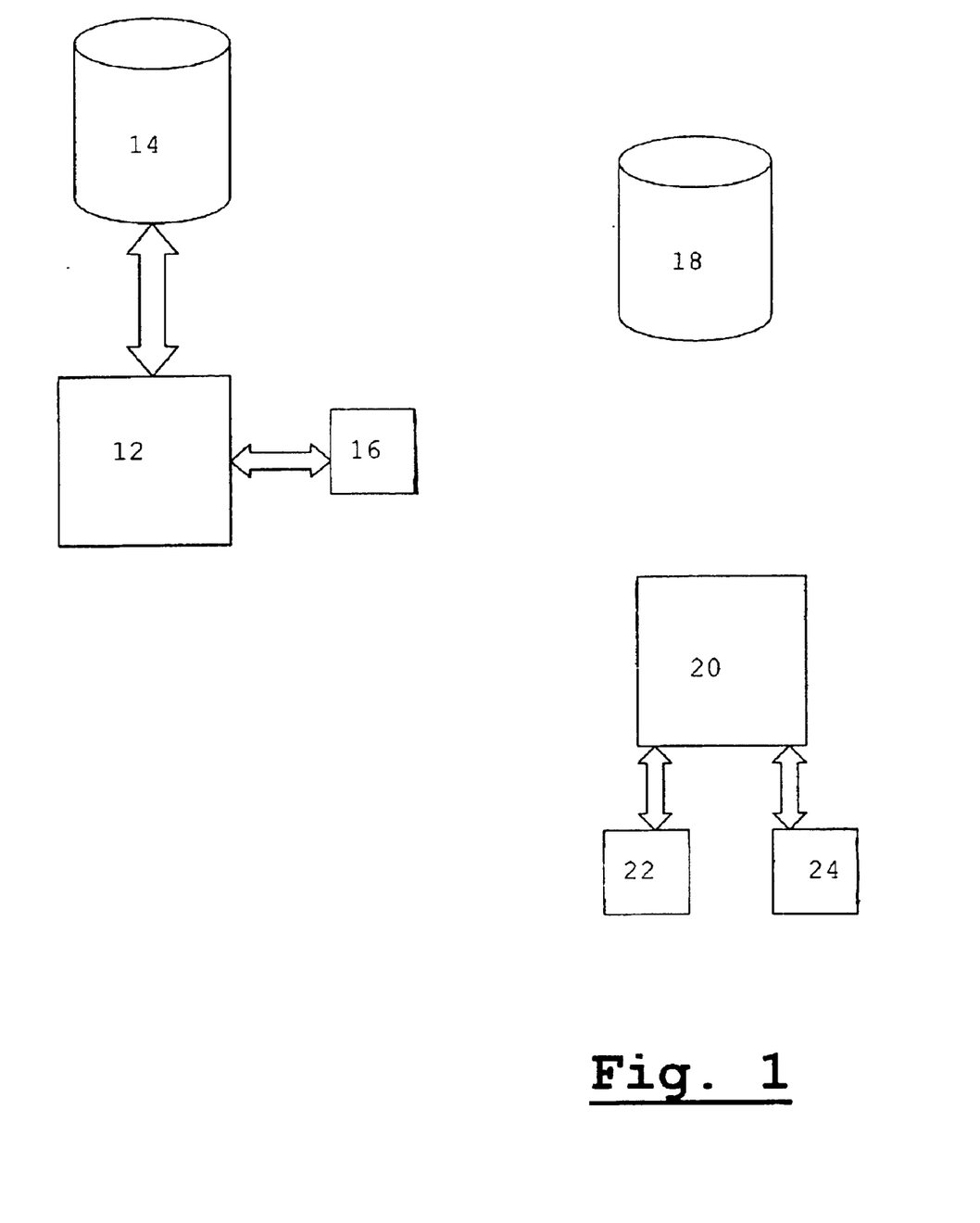
FIG. 1 shows a system for monitoring uses of graphic works, in accordance with one embodiment of the present invention.

Referring first of all to FIG. 1, this shows a system for use in monitoring uses of graphic works, in accordance with an embodiment of the present invention. The system includes a data processing device 12, such as a computer, which is in direct data communication with a computer database 14 and a data communications device 16 such as a modem or other telecommunications network connection. The computer 12 is executing appropriate computer software to interface with the database 14.

The database 14 contains a number of data entries, each of which comprises a number of data fields. One of the data fields is a pointer to a digital representation of a graphic work to be monitored; for example, the location of the representation on a server. In certain embodiments, the field may be the representation itself, although it will generally be more convenient to use only a pointer. The representation may be a digital photograph in JPEG format. The photograph itself may be the graphic work to be monitored, or the subject of the photograph may be the work; for example, the photograph may be of a painting or the like.

Each data entry also includes a number of additional data fields. These include information on the owner of any rights in the work (for example, the name of the copyright holder), and of any licensed users of the work (for example, the name of any third party entitled to make use of the work for, for example, a particular advertising campaign). Further data fields may optionally be included, holding details of, for example, the length and extent of the licensed users entitlement to use the work; previous rights owners and licensed users; keywords classifying the subject matter of the work; and the like.

The communications device 16 is used to connect the computer 12 to the internet 18 for monitoring uses of works, as will be described below, and may be used to contact third party computers 20, either directly, as shown in the Figure, or via any number of intermediaries. The third party computer 20 is provided with one or more data entry devices 22, which may include keyboard, mouse, and a scanner, and a visual display device 24.

Figure 2:
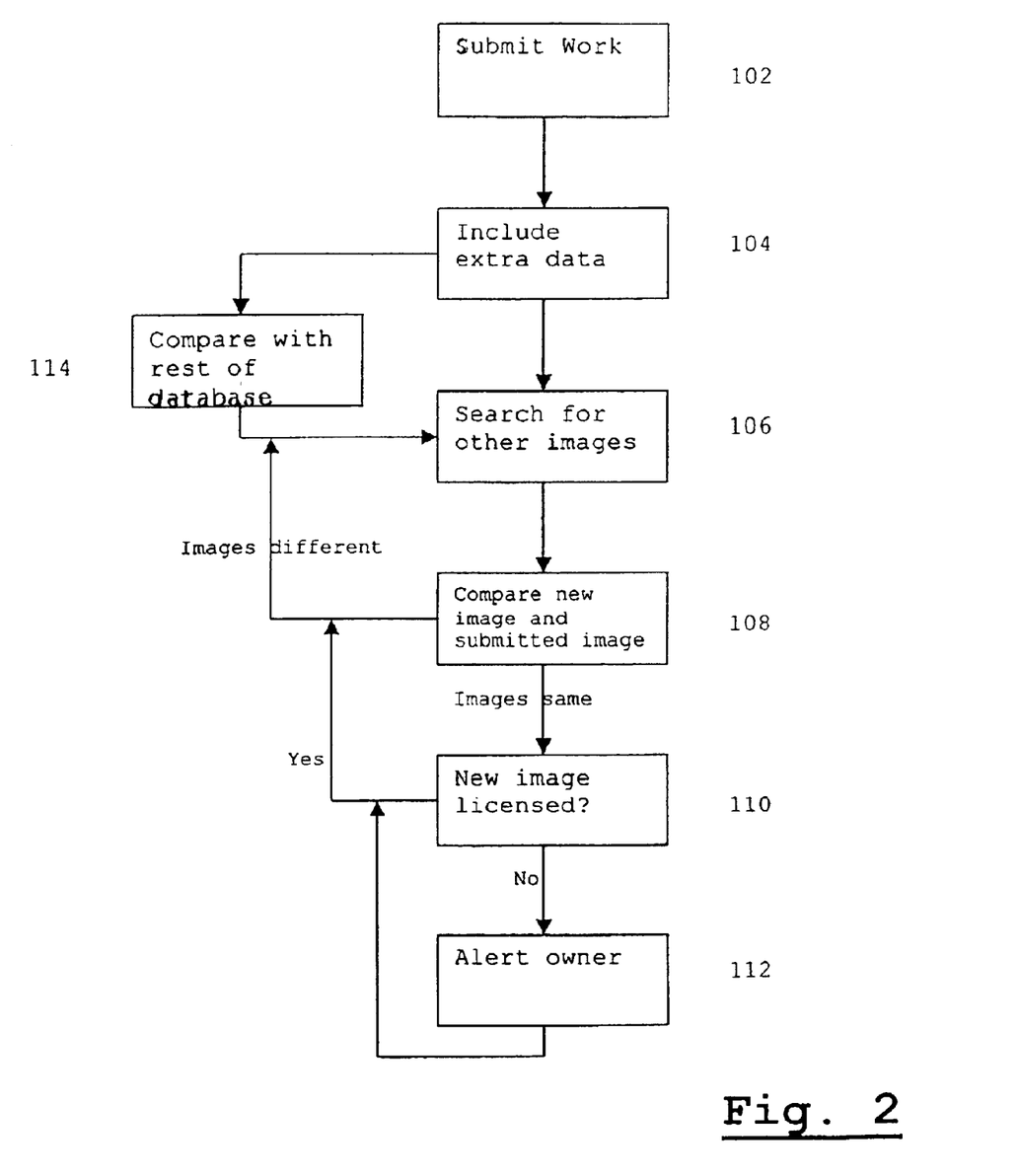
FIG. 2 is a flowchart representing a method of monitoring uses of graphic works in accordance with an embodiment of the present invention.

The operation of the system will now be described, with reference now made also to the flowchart of FIG. 2. Before the monitoring system may be used, a work to be monitored must be submitted 102 to the database 14. This may be done by the operator of the database 14 simply uploading a digital representation of the work to the database by means of the computer 12. Alternatively, third parties such as rights owners or image brokers such as artists' agents may wish to submit works without the intervention of the database operator. This may be done by using the data entry device 22 of a third party computer 20 to prepare a data file of the digital representation, and making a connection to the data communications device 16 to transfer the data from the third party computer 20 to the database operator computer 12, and hence to the database 14. In practice, suitable firewalls and other guards against malicious data submission or unauthorised access will be in place. Digital representations may be prepared by the rights owner or database operator themselves, or may be provided by third party intermediaries, such as gallery owners or agents, in return for a fee.

In addition to the digital representation itself, such additional data entries as are required are also prepared and submitted 104 to the database 14, along with an indication that they are to be associated with the submitted work. At least the owner of rights in the work (which may include an agent or authorised representative rather than the actual legal titleholder) and details of any licensed users will be submitted. This data may be submitted together with the representation, and by the same channels, or subsequently. Additional data entries may also be made at the same time by the submitter, or may be added automatically (for example, a timestamp may be included automatically in the data to indicate the date and time of submission), or manually (for example, the database operator may wish to include a description of the work or selected keywords to aid searching and classification).

Once the work has been submitted to the database, an optional step 114 may be carried out of comparing any newly-submitted images with existing database entries to identify any duplicate entries or discrepancies. The comparison procedure is much as will be described below with reference to comparison of a submitted work and a potentially infringing work. Where a discrepancy is found (for example, two rights owners claim to own the same work), the dispute is referred to both the alleged owners or to an arbitrator for resolution before one of the submissions will be allowed to remain on the database. In certain embodiments of the invention, and in certain circumstances, it is possible that both submissions may be allowed to remain on the database.

The process of monitoring for potentially unauthorised use of the work now takes place as follows. The initial step 106 is to obtain comparison images from the internet or other network 18. To do this, a webcrawler computer program is used, which automatically downloads any image files found on a website or publicly accessible server, together with information regarding the user of the image (typically the URL, although where additional information is available, such as copyright information in metatags or the like, this may also be retrieved). The webcrawler program may be run automatically, and will continually obtain new images for the monitoring procedure.

In addition to, or instead of, obtaining images from the internet, the obtaining step 106 may include obtaining images from other host computers or computer networks. In certain embodiments of the invention, third parties may be engaged to digitally scan images used in magazines, brochures, and other publications, and record them in a separate computer database for use as comparison images, thereby allowing the method of the present invention to monitor non-Internet uses of works. Alternatively, the method may be used on a purely local basis, for example, within the intranet of a single organisation or group of organisations, in which case retrieving images from the internet 18 is unnecessary.

Obtained images may also be stored in a local cache for a temporary period, to allow subsequent iterations of the monitoring method to access these images more rapidly than if the image has to be retrieved from the internet once more. In certain embodiments of the invention, results from the image comparison step may also be cached, to allow more rapid comparison of cached images.

Once a comparison image has been retrieved, both the comparison image and the submitted work are transferred into the local working memory of the computer 12, and the two images are compared 108. The comparison determines a level of similarity between the two images, based on any suitable algorithm, many of which will be known to the skilled person; for example, wavelet analysis; matching of hue, texture, or outlines; or the use of commercially available tools such as Imatch, available from photools.com. A series of algorithms may be applied, each measuring a different aspect of the images, with the similarity scores of the algorithms being given appropriate weightings to determine an overall similarity score. Alternatively, neural networks or other artificial intelligence programs may be employed, which will gradually learn how to determine image similarity over time, with appropriate feedback. The determined level of similarity is then compared to a predetermined similarity threshold; where the images are determined to be dissimilar, the method returns to the retrieval step 106 to continue with the monitoring. The similarity may be determined in a two-stage process, whereby an initial assessment of similarity is conducted using a relatively insensitive algorithm, while probable matches are then referred to a more sensitive algorithm. In this way, the longer processing times needed for execution of the sensitive algorithm may only be applied to probable matches.

If the images are determined to be similar, the method proceeds to step 110. In certain embodiments of the invention, when the similarity between the images is determined to be borderline (for example, above a threshold indicating that they are dissimilar, but below a threshold indicating they are definitively similar), the two images may be referred to a human operator for a final decision. Human operators may also be involved in several other steps of the method, such as determining whether or not to alert a rights owner or the like. The degree of human involvement will depend on the operator of the method and the desired level of expert human judgement to be incorporated into the method. For example, customers of the method operator may pay differing fee levels according to differing levels of human involvement, depending on the level of service and degree of human judgement desired by the customer.

When the images are similar, it is then determined whether the user of the comparison image is a licensed user 110. The data field of the submitted representation denoting licensed users is compared with the information obtained regarding the user of the comparison image, to determine whether they are the same. In certain embodiments of the invention, suspected unauthorised users may be invited to submit evidence of their entitlement to use the image (for example, a sublicense or the like), before any further action is taken. If the user is licensed, then the method returns to the retrieval step 106 to proceed further. If the user is identified as being unlicensed, then the rights owner of the submitted work as identified in the database is alerted 112 of the possible unlicensed use. This alert may be automatically sent by email or the like. The method may further include giving advice or support to the rights owner to take action or enforce their rights against unlicensed users.

Figure 3:
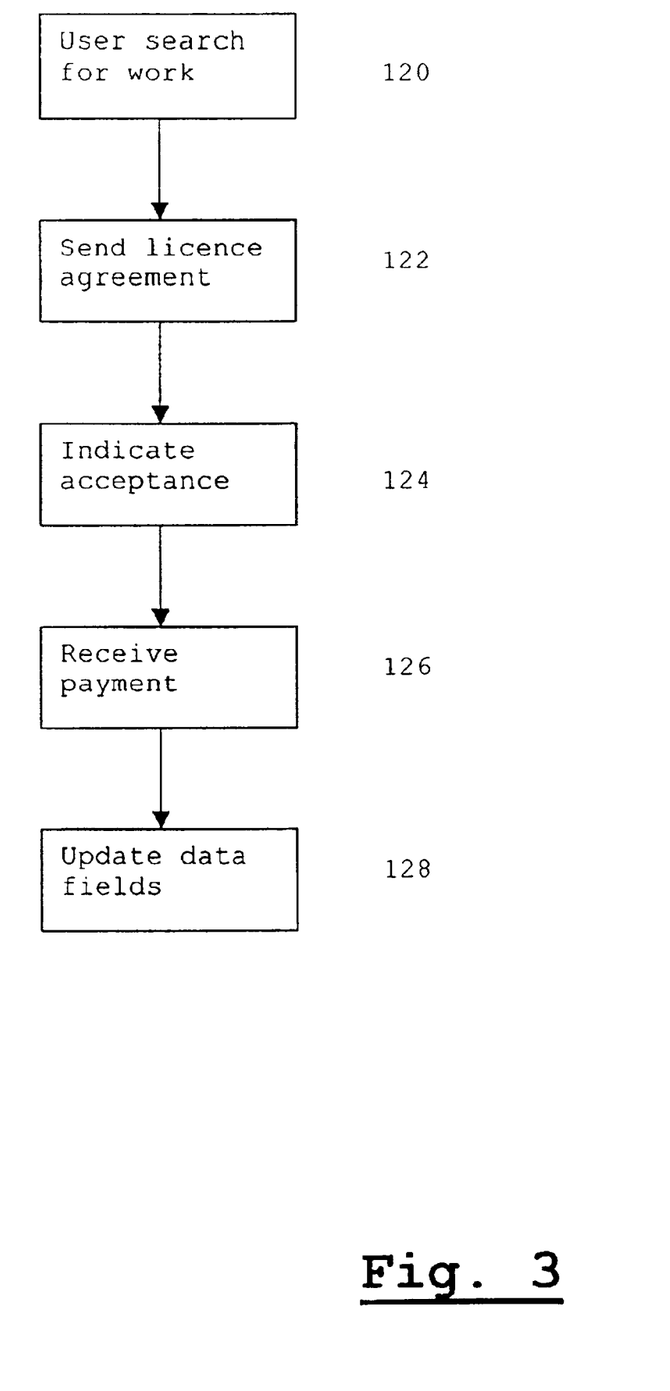
FIG. 3 is a flowchart representing a method of licensing uses of graphic works in accordance with an embodiment of the present invention.

Once the database 14 has been created, it may be used for a number of additional purposes as well as simply monitoring unlicensed uses of works. For example, FIG. 3 shows a method using the database 14 to allow third parties to become licensed users of a submitted work. The third party may be an agent or an intermediary, to reduce the risk of sensitive license information being seen by potential competitors.

The third party makes use of the third party computer 20 to access the database 14, and to search for a desired work 120. The search may be conducted on any of the data fields included on the database, such as rights owner, subject matter, and the like. Submitted works may not be available for licensing; if this is the case, such works may include an additional data field flag denoting this fact, and the work will not be available for searching by third parties for this purpose.

The search results may then be displayed on the display unit 24 of the third party computer 20. The third party may select particular works to view; certain embodiments of the invention may include low resolution or reduced quality versions of submitted works on the database for public viewing. Once a desired work has been found, the third party will submit a request for a licence to the database operator computer 12. Standard licence agreements may be maintained on the database 14 suitable for a range of different potential uses, and the type of use may be indicated in the third party request. The rights owner or their agent may he notified at this stage to approve the proposed license agreement before the agreement is concluded.

A licence agreement is then communicated 122 to the third party computer 20, where it may be read by the third party. If the terms and conditions of the agreement are acceptable, the third party then indicates acceptance 124 by transmitting an acceptance together with suitable payment 126 to the operator computer 12 The operator computer 12 then updates the data fields 128 of the licensed work on the database 14 to indicate the identity of the newly licensed user and the extent of the licence.

Where the database contains publicly available versions of each work, the database 14 may further be updated to indicate that the licensed user may now access the full size high quality version of the work. A URL or other identifier will then be sent to the third party to allow them access to the high quality version of the work to enable use to begin.

This licensing method may of course be integrated with the monitoring method described previously, or may be carried out as a separate operation. Alternatively, or in addition, the licensing model may be adapted to include a low fee for each access of a low-resolution image, and a higher fee for accessing a higher-resolution image. In this way the rights owner may obtain revenue from each time the image is accessed, regardless of whether it is the low or high resolution image. Further, records of parties accessing the images may be taken, and passed to the rights owner or other interested third parties in return for a fee. This allows rights owners to monitor which of their works are popular, and with whom.

Many further uses of the database 14 will be apparent to the skilled person. For example, third parties may be simply permitted to view thumbnails or high quality images of submitted works to act as a portfolio view of artists or rights owners. The database may be used to demonstrate ownership of works, for insurance purposes or the like. Lost or stolen works of art may be submitted to either a common or a separate database, which will then be used to monitor the internet and auction catalogues and so forth, to assist in identifying any appearances of the missing work.

Other possible users of the invention include image creators (such as photographers, illustrators, artists, sculptors, film makers, graphic designers, web designers, advertising agencies, fashion designers, interior designers and architects), who may wish to use the invention for assertion of copyright in a work, infringement reports (to determine if any infringements can be found), storage of important works, and access to potential clients.

The invention may also be used by brand or personality management, for similar purposes as well as monitoring of unauthorised uses of images of the personality or brand. A further variation may be to use the method in monitoring the degree of 'brand penetration', that is, the extent to which a particular brand or image may be found within a target market; for example, by monitoring occurrences of a particular image. Image publishers, such as art galleries or photograph libraries, may use the invention for access to potential clients as well as inventory and management of their portfolio.

The invention may further find application in portfolio management, inventory management, corporate storage or inventory, and the like. Numerous other applications and possible users will of course be apparent to the skilled person, and the invention is in no way limited to those uses and users thus far described.

What is claimed is:

1. A method of monitoring uses of graphic works, the method comprising the steps of:
    storing a digital representation of a work in a computer database;
    associating data entries with the stored representation, the data entries indicating at least the owner of rights in the work and details of any licensed users of the work;
    obtaining a comparison digital representation and information regarding the user of the comparison representation from a remote host computer;
    comparing the stored representation with the comparison representation, to determine the level of similarity between the representations;
    determining whether the level of similarity exceeds a predetermined threshold;
    if the level of similarity does exceed the threshold, determining whether the user of the comparison representation is a licensed user of the stored representation; and
    alerting the owner of rights in the stored representation if the user of the comparison representation is not licensed.

2. A method according to claim 1, wherein the stored representation is stored as a non-encrypted computer file.

3. A method according to claim 1, wherein the step of storing the digital representation of the work is carried out by directly transferring the representation from a rights owner's storage medium to the database.

4. A method according to claim 1, wherein the step of storing the digital representation of the work comprises the step of automatically storing representations as they are created.

5. A method according to claim 1, wherein the step of storing the digital representation of the work comprises the steps of creating and storing representations by third parties from works created by the rights owners.

6. A method according to claim 1, wherein the data entries associated with the stored representation are combined with the representation into a single computer data file.

7. A method according to claim 1, wherein the data entries include information selected from the following group: details of the extent and scope of any licences granted; availability of possible licences; details of the licensing history of the work; details of the ownership history of the work; details of the ownership history of any rights in the work; details of the author of the work; whether the representation is publicly available for viewing in the database; date of creation of the work; date of submission of the representation to the database; information regarding the work itself.

8. A method according to claim 1, further comprising the step of comparing the stored representation with previously stored representations, to determine the level of similarity between the representations.

9. A method according to claim 1, wherein the step of obtaining a comparison representation from a remote host computer comprises downloading the representation from a computer network.

10. A method according to claim 1, further comprising the step of temporarily saving comparison representations in a local memory cache once they have been obtained.

11. A method according to claim 1, further comprising the step of manually storing comparison representations in a host computer for subsequent comparison.

12. A method according to claim 1, wherein the comparison step comprises a multi-step process.

13. A method according to claim 12, wherein the comparison step comprises the use of a relatively less accurate matching tool to identify likely matches, followed by a more accurate comparison performed on the likely matches.

14. A method according to claim 1, wherein the step of determining whether the user is a licensed user comprises comparison of the data entries regarding licensed users of the work with the information regarding the user of the comparison representation.

15. A method according to claim 14, wherein additional information is included in the comparison, to determine whether a user has breached any terms of a licence.

16. A method according to claim 1, further comprising repeating the obtaining, comparison, and determination steps a plurality of times, to allow multiple comparison representations to be obtained and compared.

17. A method according to claim 1, further comprising the step of charging an owner of rights in return for storing the representation in the database.

18. A method of monitoring uses of graphic works, the method comprising the steps of:
   retrieving a stored digital representation of a work from a computer database, together with information regarding at least the owner of rights in the work and details of any licensed users of the work;
   obtaining a comparison digital representation and information regarding the user of the comparison representation from a computer database;
   comparing the stored representation with the comparison representation, to determine the level of similarity between the representations;
   determining whether the level of similarity exceeds a predetermined threshold;
   if the level of similarity does exceed the threshold, determining whether the user of the comparison representation is a licensed user of the stored representation; and
   alerting the owner of rights in the stored representation if the user of the comparison representation is not licensed.

19. A method of monitoring uses of graphic works, the method comprising the steps of:
   storing a digital representation of a work in a computer database;
   associating data entries with the stored representation, the data entries indicating at least the owner of rights in the work;
   obtaining a comparison digital representation from a remote host computer;
   comparing the stored representation with the comparison representation, to determine the level of similarity between the representations;
   determining whether the level of similarity exceeds a predetermined threshold;
   if the level of similarity does exceed the threshold, alerting the owner of rights in the stored representation of the comparison representation.

20. A method of licensing uses of graphic works, the method comprising the steps of:
   storing a digital representation of the work in a computer database;
   associating data entries with the stored representation, the data entries indicating at least the owner of rights in the work and details of any licensed users of the work;
   allowing third parties to view the stored representation;
   making an agreement with a third party to permit certain uses of the representation in return for payment; and
   updating the data entries associated with the representation to include an indication of the identity of the third party.

21. The method of claim 20, wherein the stored representation of the work comprises a reduced quality representation, and a higher-quality representation.

22. The method of claim 20, further comprising the step of allowing third parties to search the database for particular categories of work.

23. The method of claim 20, wherein the agreement made with the third party is mediated by means of a computer interface.

24. The method of claim 23 wherein the computer interface is also used to view the stored representation.

25. The method of claim 23 wherein the agreement is concluded from the computer interface while accessing the database.

26. The method of claim 20, wherein the step of making the agreement comprises the steps of: transmitting an offer to permit uses of the representation to the third party; receiving an acceptance of the offer from the third party; and receiving payment details from the third party.

27. The method of claim 20 further comprising the step of permitting the third party to access the stored representation in accordance with the terms of the agreement.

28. The method of claim 20, wherein the data entries associated with the representation further include information regarding the nature and extent of the agreement with the third party.

29. A system for monitoring uses of graphic works, the system comprising:
   a computer database for storing digital representations of graphic works, together with database entries associated with each representation, the database entries indicating at least the owner of rights in the work and details of any licensed users of the work;
   data communications means for communicating with and retrieving data including comparison representations and users of such representations from a remote host computer; and
   data processing means for retrieving representations from the computer database and for receiving communications from the data communications means; for comparing representations to determine their level of similarity; for determining whether a user of a comparison representation is a licensed user of a stored representation; and for alerting an owner of rights if a user of a comparison representation is not licensed.

30. The system of claim 29, further comprising data input means for adding data entries and representations to the computer database.

31. The system of claim 29 further comprising means for allowing third parties to view stored representations.

32. The system of claim 29 further comprising data processing means connected to the data communications means for concluding agreements with third parties regarding use of stored representations.

33. The system of claim 32 wherein the data processing means comprises means for permitting secure electronic payment in return for use of stored representations.

* * * * *